United States Patent
Cigarini et al.

(10) Patent No.: US 11,167,952 B2
(45) Date of Patent: Nov. 9, 2021

(54) WINDING SPOOL FOR A WIRE

(71) Applicant: TECOMEC S.R.L., Reggio Emilia (IT)

(72) Inventors: Enrico Cigarini, Reggio Emilia (IT); Salvatore Longo, Cadelbosco Sopra (IT)

(73) Assignee: TECOMEC S.R.L., Reggio Emilia (IT)

( * ) Notice: Subject to any disclaimer, the term of this patent is extended or adjusted under 35 U.S.C. 154(b) by 156 days.

(21) Appl. No.: 16/565,676

(22) Filed: Sep. 10, 2019

(65) Prior Publication Data
US 2020/0079614 A1    Mar. 12, 2020

(30) Foreign Application Priority Data
Sep. 12, 2018 (IT) .................. 102018000008539

(51) Int. Cl.
*B65H 75/14* (2006.01)

(52) U.S. Cl.
CPC ................................ *B65H 75/146* (2013.01)

(58) Field of Classification Search
None
See application file for complete search history.

(56) References Cited

U.S. PATENT DOCUMENTS

| | | | | |
|---|---|---|---|---|
| 10,314,229 B2* | 6/2019 | Arnetoli | ............. | A01D 34/4166 |
| 2011/0119932 A1* | 5/2011 | Pfaltzgraff | ......... | A01D 34/4165 |
| | | | | 30/347 |
| 2013/0133208 A1* | 5/2013 | Skinner | ............. | A01D 34/4166 |
| | | | | 30/347 |
| 2015/0121707 A1* | 5/2015 | Li | ...................... | A01D 34/4161 |
| | | | | 30/276 |
| 2015/0342116 A1* | 12/2015 | Sprungman | ........ | A01D 34/4166 |
| | | | | 30/276 |
| 2016/0081268 A1* | 3/2016 | Lang | .................. | A01D 34/4166 |
| | | | | 30/276 |
| 2016/0128276 A1* | 5/2016 | Arnetoli | ............ | A01D 34/4166 |
| | | | | 30/276 |
| 2017/0094900 A1* | 4/2017 | Arnetoli | ............ | A01D 34/4166 |
| 2017/0347523 A1* | 12/2017 | Alliss | ................. | A01D 34/4166 |
| 2017/0349394 A1* | 12/2017 | Alliss | .................... | B65H 54/30 |
| 2018/0020614 A1 | 1/2018 | Alliss | | |
| 2018/0168098 A1 | 6/2018 | Alliss | | |
| 2018/0177122 A1* | 6/2018 | Skinner | ............. | A01D 34/4166 |
| 2019/0075721 A1* | 3/2019 | Cholst | ............... | A01D 34/4166 |
| 2020/0296888 A1* | 9/2020 | Arnetoli | ............ | A01D 34/4166 |

FOREIGN PATENT DOCUMENTS

| | | |
|---|---|---|
| CN | 107646291 A | 2/2018 |
| EP | 2923549 A1 | 9/2015 |

* cited by examiner

*Primary Examiner* — William A. Rivera
(74) *Attorney, Agent, or Firm* — Pearne & Gordon LLP

(57) ABSTRACT

Spool 1 for winding wire 2 comprising a hub 3, having a cylindrical external surface 4 extending around a main axis X-X, on which a channel 5 is afforded for guiding the wire 2 through the hub 3 terminating with a first hole 51 and a second hole 52.
Three flanges 6,7,8 to define at least two chambers for winding the wire about the hub 3.
Wherein the aforesaid hole 51 terminates with a respective terminal portion 9 made inside the cylindrical external surface 4.

8 Claims, 6 Drawing Sheets

PRIOR ART

PRIOR ART

WINDING SPOOL FOR A WIRE

The present invention relates to a winding spool for cutting wires for hedge trimmer heads.

The present invention can be applied in the field of both amateur and professional gardening.

Hedge trimmers are intended as those devices used to cut grass.

Hedge trimmers generally provide a main tube inside which a drive shaft is moved by a combustion engine or an electric motor, the latter supplied by a battery or mains power supply.

At about halfway down the length of the hedge trimmer, it can provide a pair of arms to facilitate the movement of the tool.

At the terminal end, connected to the drive shaft by means of suitable geared drive transmission means, a head is present: a disc-like box body from which at least one, preferably two, length/s of cutting wire made of plastic material exit.

Holding the tubular body, the operator moves the hedge trimmer to circumference sectors by placing the head near the ground on which grass is present, or more generally vegetation to be cut.

Due to the effect of the centrifugal force, the cutting wire rotates at a speed such as to cut the grass and weeds, shearing them.

The cutting wire is therefore a portion of consumable material, i.e. a wire-shaped element which, as it is worn down or breaks due to the presence of elements with high resistance (such as for example the edges of pavement or portions of trunks), must be replenished, from the inside of the head to the outside of the same, so as to guarantee the hedge trimmer a durable cutting action against the vegetation.

For this reason a variant of the known heads on the market provides a coil of wire wound about a spool so that a small part of the wire protrudes from the head and for the most part, less and less during the operation of the machine, is wound inside the head ready to be dispensed to the outside if necessary.

Every time the lengths of wire outside the head are consumed, the operator, by means of an operating process known in the market with the name "tap and go", hits the head on the ground and allows a spool, a component inside the head which receives the entire coil in winding, to dispense new lengths of wire out from openings provided on the head.

Alternatively there are variants of the head with automatic dispensing of the wire whenever the lengths are consumed.

Once the coil of wire is finished, the operator must see to loading a new coil of wire.

In this step, the operator stops the machine (the hedge trimmer) and sees to winding a new coil of wire about the spool.

The loading of the new wire can be totally manual, following the opening of the head, or automatic, without opening the head, due to the effect of a latching system known in the sector.

In the case of manual loading, the operator opens the head and, once the wire has been inserted through the spool, begins to wind the wire about the spool.

Since the head is generally provided with two outlet holes of the wire, the coil is evenly wound on two portions of the spool. In other words, approximately half the coil is wound around a first chamber of the spool, defined by a central flange and an upper flange, and the remaining half is wound around a second chamber of the spool, defined by the central flange and the lower flange.

The central flange approximately divides the spool in half, defining two winding portions (or chambers).

During this winding operation it is possible that the wire, after a few turns about the spool in the first chamber, tends to invade the second chamber where, in the meantime, the operator is winding the other half of the wire.

This incorrect loading process is mainly due to the state of preservation of the coil of wire and the need to wind the wire, inside the two chambers, around a common winding direction (clockwise or counter-clockwise).

FIG. 1 shows the assembly of a first portion of wire, exiting from a hole afforded in the hub of the spool, and forming a curvature peak.

FIG. 2 shows the formation of a first spiral of wire that, meeting the peak of folded wire, continues with the remaining portion of the wire to be wound in the underlying chamber where the wire should not be wound, considering that this latter chamber is affected by the other plurality of spirals obtained with the other half of the coil.

Figure 1:
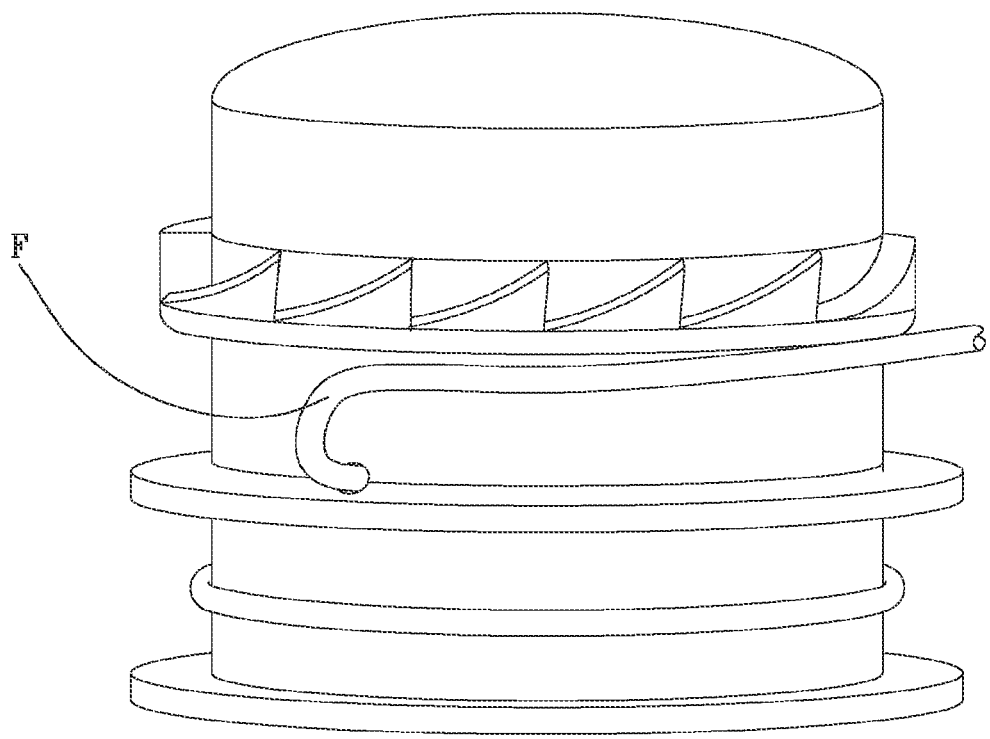
FIGS. 1 and 2 show the current state of the art.

Since the wire must have a sufficient mechanical strength to prevent it from frequently breaking during the cutting operations, and since the wire has its own memory of shape curvature, imparted to the wire in the extrusion process and by the winding direction of the coil in the conservation state of the wire, it is understandable, taking FIG. 1 as a reference, how the first wire portion protruding from a loading hole generates a peak at the portion of wire that comes into contact with the second winding chamber.

More precisely, in the lower winding chamber where a first spiral of wound wire F' is schematically shown, it can be noted how the winding occurs in substantial adherence to the cylindrical body while in the other winding chamber, the upper one, the first spiral of wire F is generated with the formation of a peak.

This peak is partly due to the hardness of the wire, which does not allow a very small folding radius, and is partly due to the folding direction: in the lower winding chamber of the spool, the wire is folded in a direction concordant with the folding direction of the coil, and in the upper winding chamber of the spool, the wire is folded in a direction opposite the folding direction of the coil (or vice versa).

Figure 2:
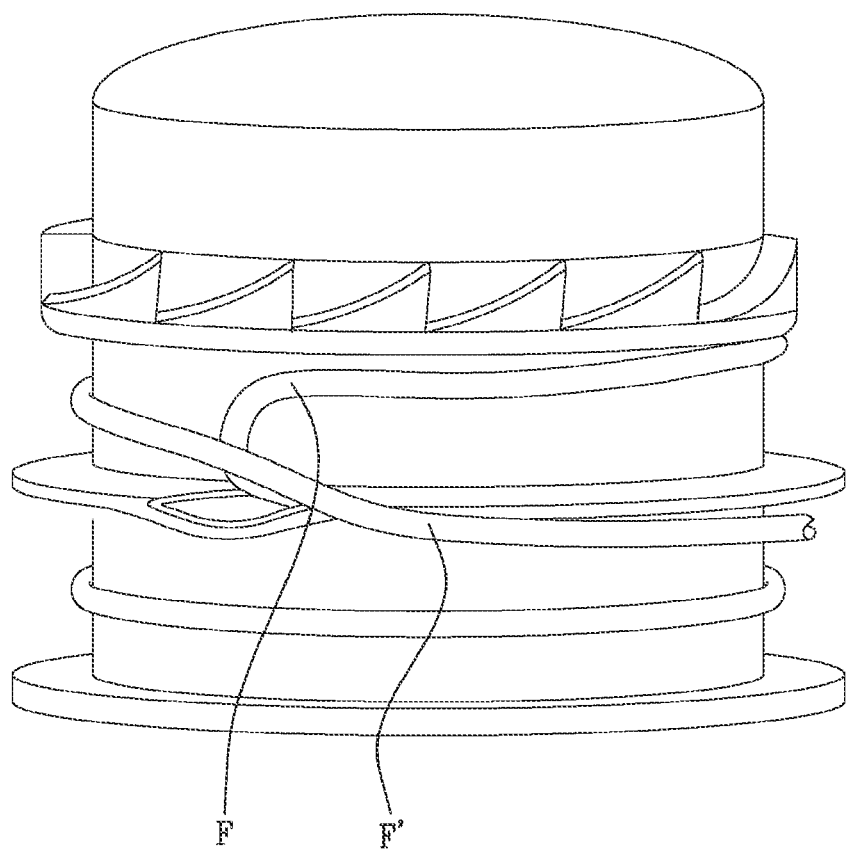

The aforesaid peak, during the subsequent loading of the wire about the spool as illustrated in FIG. 2, brings the respective half of the coil to wind inside the respective winding chamber for the first sections, and for the successive sections, outside the aforesaid respective chamber, invading the contiguous chamber.

In other words the aforesaid peak, also passed for only one winding turn of the wire around the chamber, guides the wire into the other winding chamber where meanwhile the other half of the wire is winding.

In this context the wire is therefore loaded in an incorrect mode which then generates, during the operation of the hedge trimmer, jamming in the wire length dispensing procedure due to the incorrect winding procedure itself.

If the operator is aware of the incorrect wire winding mode, he or she can remedy the issue, returning to unwind the coil and repeating the loading operation.

It is clear that the repetition of the wire winding operations increases the non-operation times of the hedge trimmer at the expense of the efficiency of the operator's daily work.

An object of the present invention is to resolve the problems found in the known art by proposing a winding spool for wire that allows an easy loading of the wire.

In particular, an object of the present invention is to provide a device for winding wire which allows providing an effective winding of the wire already from the first loading operation.

The dependent claims correspond to possible embodiments of the invention.

Figure 3:
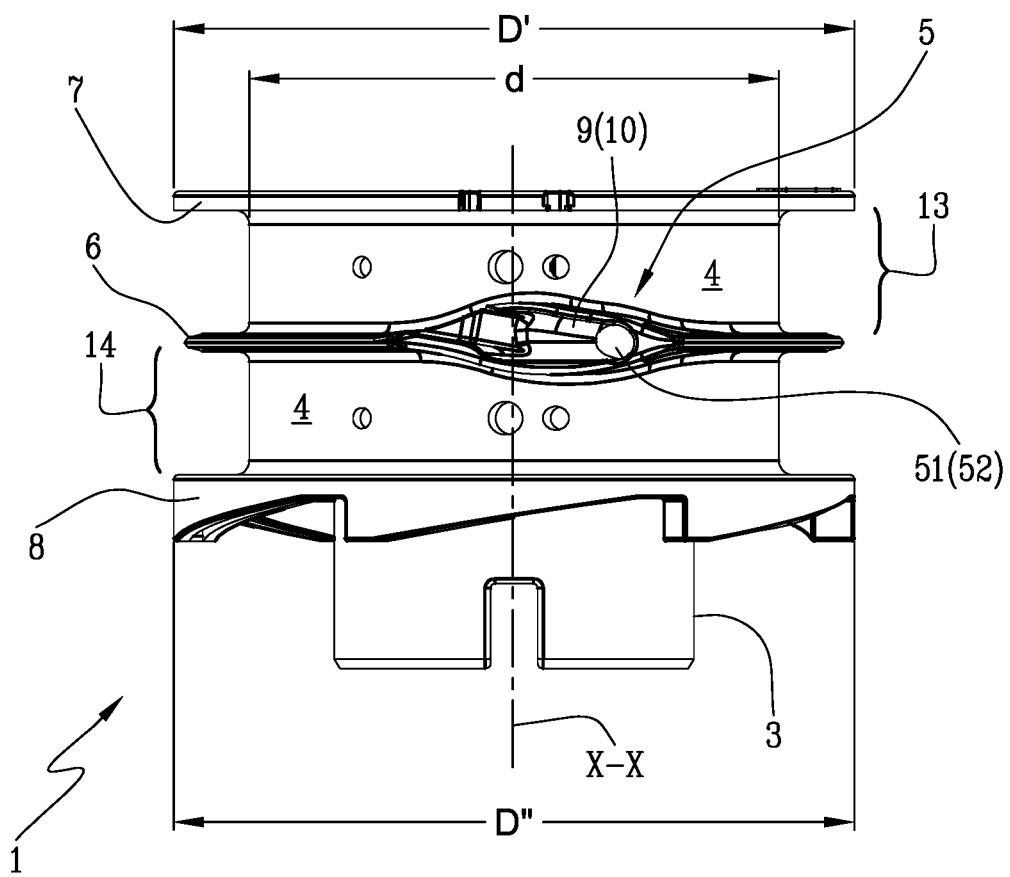
Figure 4:
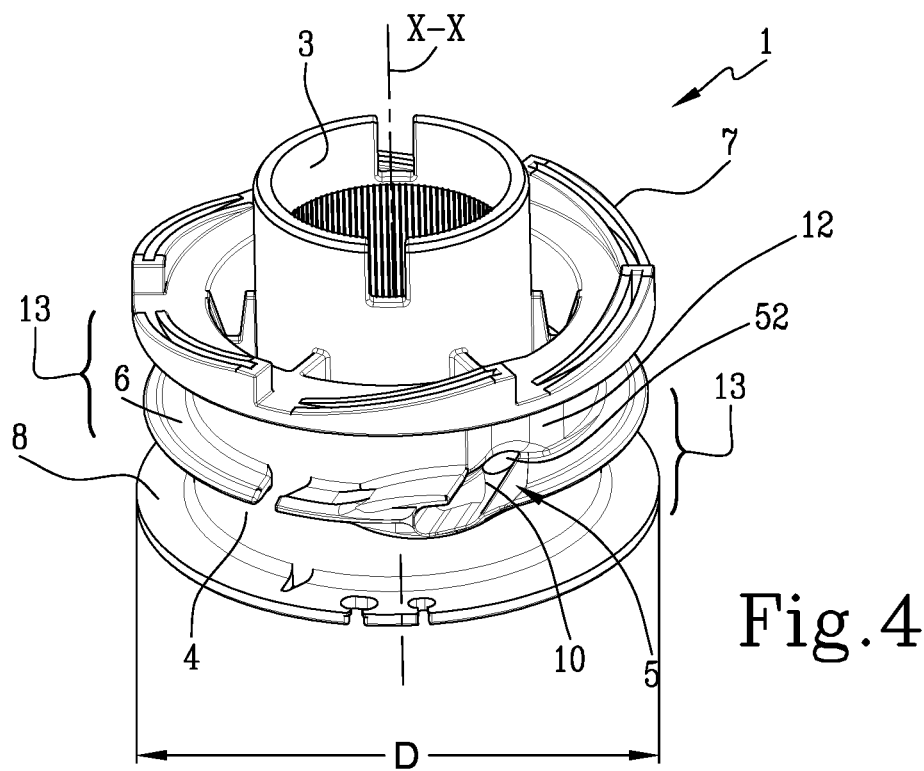
Figure 5:
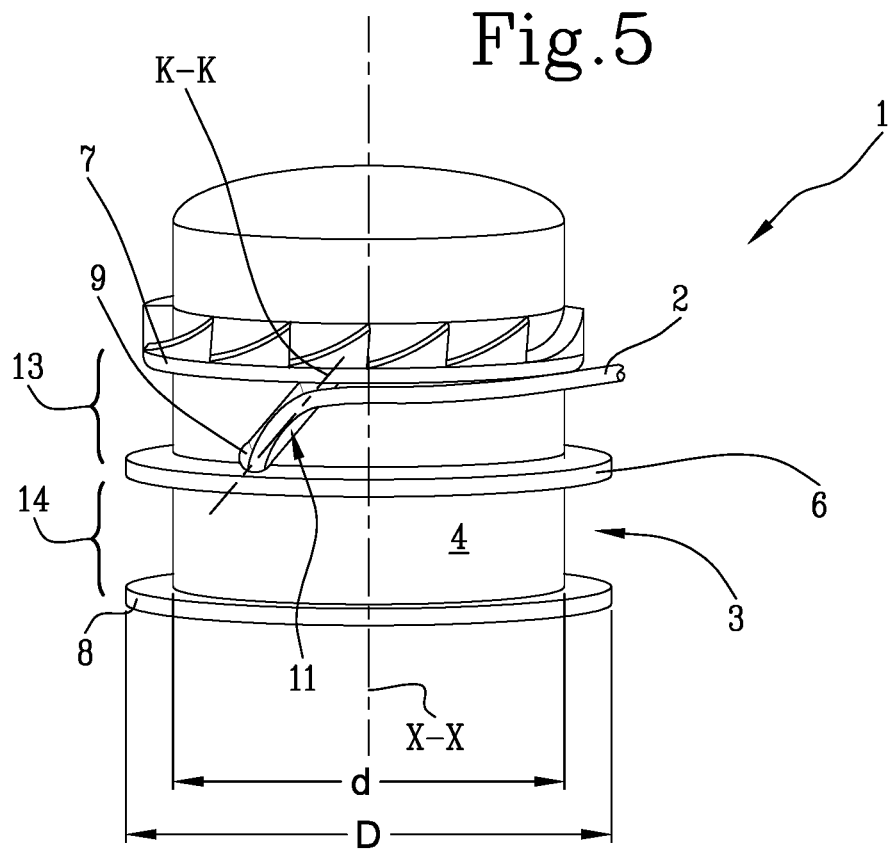
Figure 6:
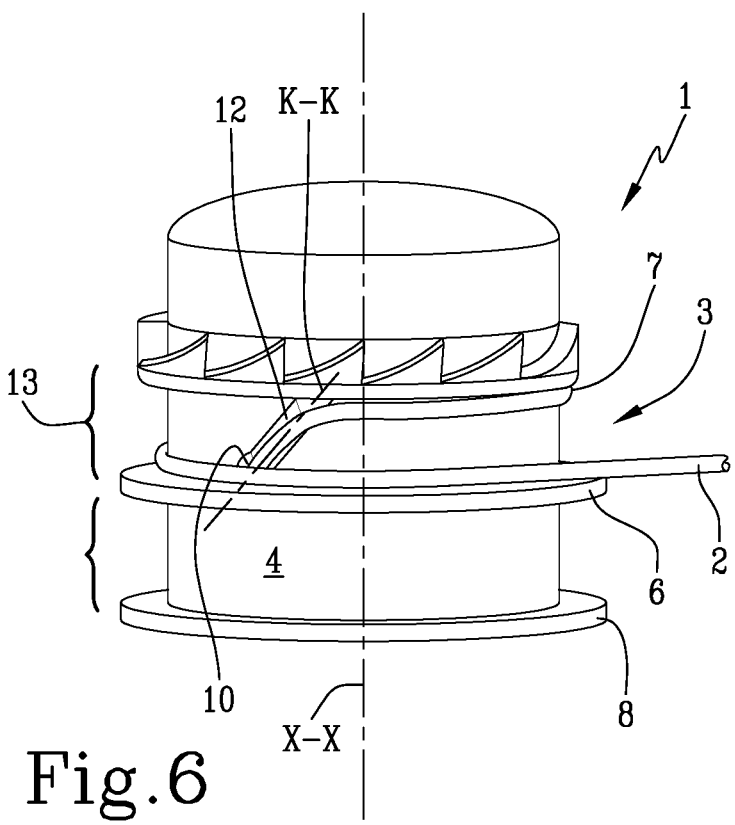
Figure 7:
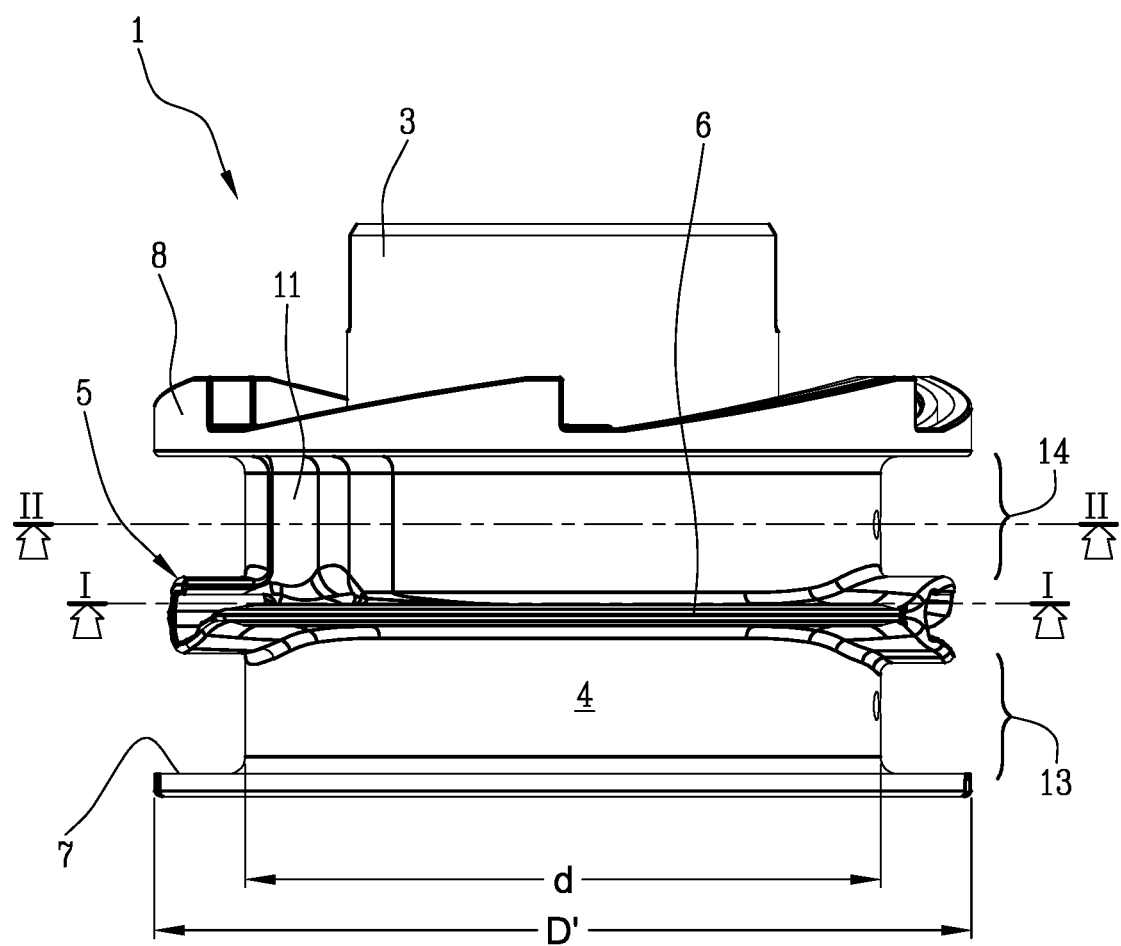
Figure 8:
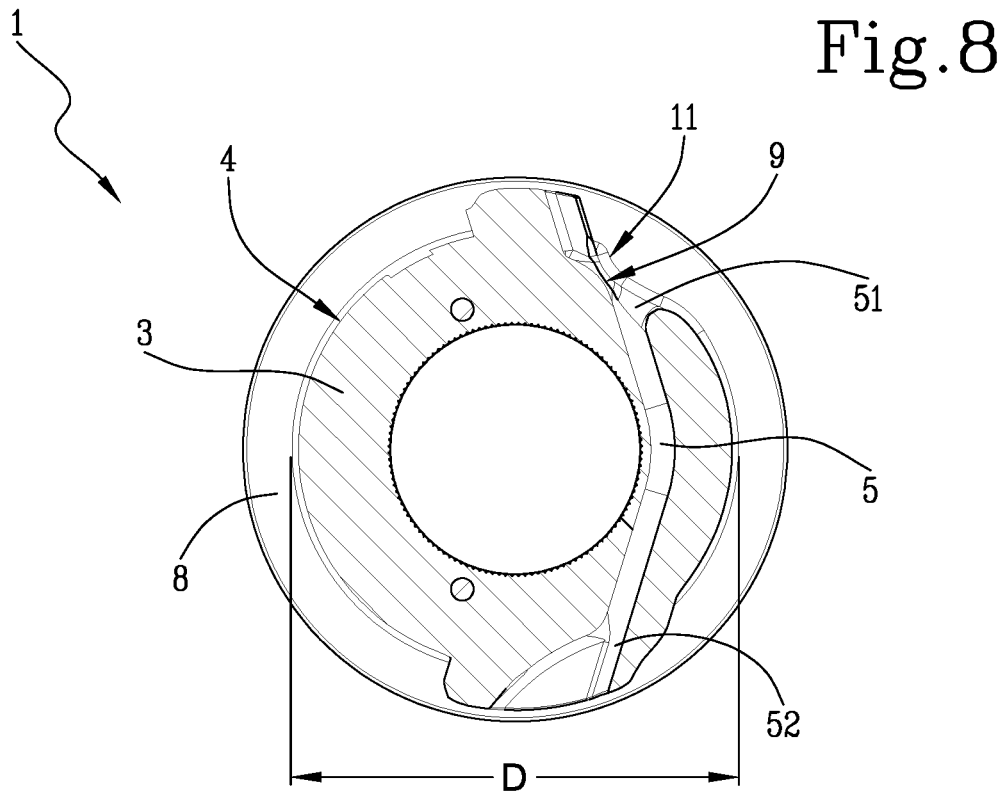
Figure 9:
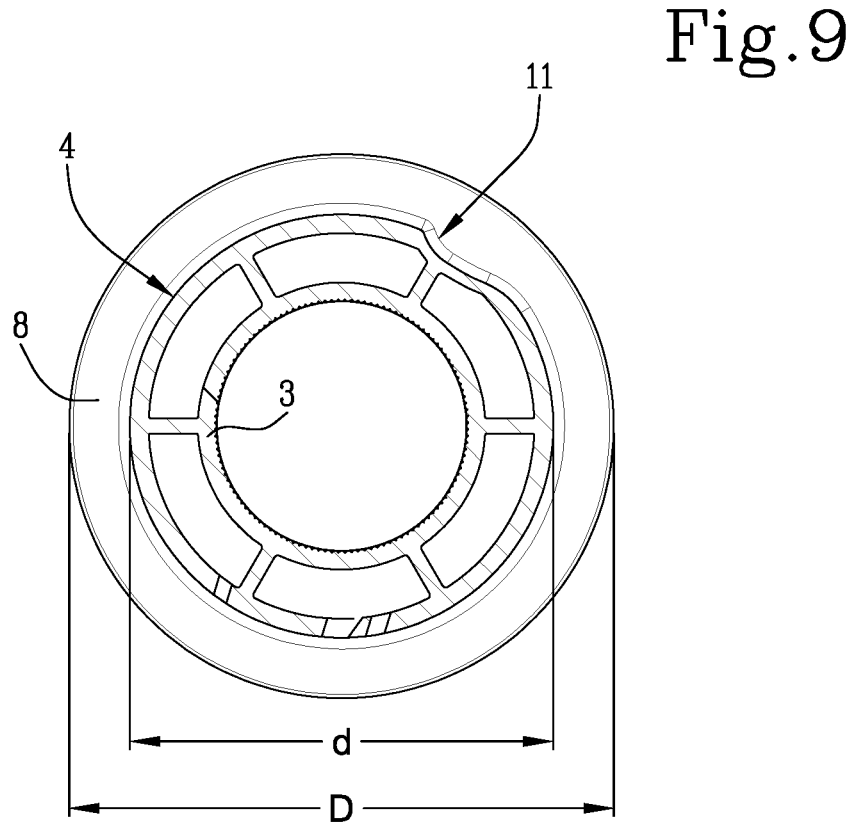

The description is provided with reference to the accompanying figures, which are likewise provided by way of illustrative and thus non-limiting example, in which:

FIGS. 1 and 2 show a winding spool of the prior art with a portion of wire F and a spiral F' wound;

FIG. 3 shows a front view of a winding spool for wire according to the present invention;

FIG. 4 shows a perspective view of the spool of FIG. 3;

FIG. 5 shows a perspective view of the spool of FIGS. 3 and 4 in a first wire loading configuration;

FIG. 6 shows a perspective view of the spool of FIGS. 3 and 4 in a second wire loading configuration;

FIG. 7 shows a further front view of the spool of FIG. 3;

FIG. 8 shows a cross-sectional view of the spool according to the I-I plane of FIG. 7;

FIG. 9 shows a cross-sectional view of the spool according to the II-II plane of FIG. 7.

With reference to the accompanying FIGS. 3-9, a preferred embodiment of a winding spool 1, of a wire 2, to apply to a hedge trimmer is shown.

The spool 1 comprises a hub 3 with a substantially hollow cylindrical shape. Said hub 3 provides an extension around a main axis X-X. The axis X-X forms the axis of symmetry of extension of the hub 3.

The substantially cylindrical shape of the hub 3 defines a cylindrical external surface 4. The hub 3 has an external diameter "d" at the cylindrical outer surface 4.

A channel 5 is afforded inside the hub 3, the channel being totally or partially closed for guiding the wire both during the loading operation and during the dispensing operations of lengths of wire in the conditions of use of the hedge trimmer.

Passing through the hub 3 from one part to the other, the channel 5 provides an extension direction transversal to the axis X-X of extension of the hub 3.

Said axis X-X, in a normal use condition of the spool 1, and therefore the hedge trimmer, lies substantially vertically.

Without departing from the scope of protection of the present invention, the channel 5 can have a linear, curved or broken trend as long as the condition of passing through the hub 3 is respected.

Without departing from the scope of protection of the present invention, the channel 5 can lie perpendicular or skew to the axis X-X and/or intersect or not intersect the axis X-X.

The channel 5 favours a distribution of a coil of wire in such a way that a portion is guided for the subsequent winding in a chamber of the spool 1 and the other portion is guided for the subsequent winding in the other chamber of the spool 1.

The channel 5 terminates with two through holes passing through the hub: first and second hole 51,52.

Said holes 51, 52 are preferably arranged at the diametrically opposite ends of the cylindrical external surface 4.

Said holes 51, 52 terminate at the cylindrical external surface 4.

Since the direction of insertion of the wire in the head, and therefore the spool, can be arbitrary depending on the model type of the head, it is equally arbitrary defining the first hole 51 as the entry hole in the hub 3, i.e. the hole into which the wire 2 enters the hub, and the second hole 52 as the exit hole from the hub 3, i.e. the hole from which the wire exits the hub 3 after transversally passing through the latter.

The hub 3 also comprises three flanges 6,7,8.

A central flange 6 is present about halfway up the height of the hub 3. The central flange 6 has a substantially cylindrical ring shape. Said central flange 6 extends away from the cylindrical external surface 4.

In other words, the central flange 6 has a radial development which continues from the hub 3 to the outside of the same.

The central flange 6 has an external diameter "D" greater than the external diameter "d" of the cylindrical external surface 4.

The channel 5 allows positioning one half of the coil of wire 2 above the flange 6 and the other half below the flange 6.

Above the central flange 6, placing the hub 3 with the axis X-X vertical, the spool 1 further comprises an upper flange 7 placed approximately at the top of the hub 3.

The upper flange 7 has a shape and dimensions that are substantially comparable to the central flange 6.

The upper flange 7 has an external diameter D' substantially equal to D.

In other words, the upper flange 7 has a disc-like ring shape, extending from the cylindrical external surface 4 lying substantially parallel to the central flange 6.

The central flange 6 and the upper flange 7 define, together with the cylindrical external surface 4, a first winding chamber 13 of the wire 2 about the hub 3.

Said first winding chamber 13 of the wire 2 is able to contain a half coil of wire due to the effect of the closing of the chamber promoted by the outer casing of the head.

Below the central flange 6, always by placing the hub 3 with the axis X-X vertical, a lower flange 8 is present, located at the base of the spool, with a shape and proportions substantially identical to those of the upper flange 7.

In other words, the lower flange 8 has a disc-like ring shape, extending from the cylindrical external surface 4 lying substantially parallel to the central flange 6.

The lower flange 8 has an external diameter D' substantially equal to D.

The lower flange 8 and central flange 6 also define, together with the cylindrical external surface 4, a second winding chamber 14 of the wire 2 about the hub 3, closed and able to contain the other half of a coil of wire.

In a preferred embodiment of the invention at least the first hole 51 terminates with a terminal portion 9 made inside the cylindrical external surface 4.

In a second preferred embodiment of the invention, each hole 51, 52 has a respective terminal portion 9, 10 made inside the cylindrical external surface 4.

Below is a detailed description of one of the two terminal portions being, in the preferred embodiment with two, substantially axially symmetrical with respect to the axis X-X of the hub 3.

The terminal portion 9 terminates below the external diameter "d" of the hub 3.

In other words the terminal portion 9 is made inside the cylindrical surface 4.

More specifically, the terminal portion 9 is made by the removal of material from the normal surface progression of the cylindrical external surface 4 with the diameter "d".

The aforesaid terminal portion 9 allows reducing the volume occupied by the portion of wire folded on itself and exiting from the hole 51.

In other words, with an equal radius of curvature of the wire folded on itself, the terminal portion 9, with respect to the usual tubular hubs of the spools of the prior art, allows starting the curvature of the wire more deeply within the hub 3, i.e. in a position closer to the axis X-X.

The portion of curvature of the folded wire, starting further inside the hub 3 at the terminal portion 9, is arranged in a position tangent to the cylindrical external surface 4 with greater ease.

The contact between the portion of curvature of the folded wire 2 and the cylindrical external surface 4 therefore occurs closer to the terminal portion 9 and therefore near the hole 51 from which the wire exits the hub.

The channel 5 also comprises, downstream of the terminal portion 9, a guide recess 11 adapted to channel the wire 2 from the hole 51, located at the central flange 6, to the upper flange 7 or lower flange 8.

Also in this case there is a variant of the invention with a terminal portion 9 with a guide recess 11 and a further variant of the invention with the terminal portion 9 provided with the guide recess 11 and with the terminal portion 10 with the guide recess 12.

In the following of the present invention a single guide recess 11 will be described in detail, as the other recess 12 is specular to the preceding one.

The guide recess 11 is a cavity having a predominant extension along a direction K-K.

Starting from the terminal portion 9 of the hole 51, and therefore from the central flange 6, the extension direction K-K has an oblique orientation terminating near, preferably before, the upper flange 7, or lower flange 8, towards which it is directed.

The aforesaid guide recess 11 facilitates, at the portion of the wire 2 folded on itself and exiting the hole 51, an adhesion of the wire 2 to the cylindrical external surface 4 of the hub 3.

In other words the guide recess 11, together with the terminal portion 9 of the hole 51 afforded inside the external surface 4, allows an adhesion of the wire to the hub 3 without projecting from the plan extension subtended by the flanges 6,7,8.

Furthermore, the wall of the guide recess 11 allows, together with the terminal portion 9, an arrangement of the first portion of the wire 2 exiting from the hole 51 without projecting from the external diameter D of the flanges 6,7,8.

By reducing the dimensions of the first portion of wire 2 exiting from the hole 51, it becomes easier to wind spirals of wire 2 about the hub.

In fact, the portion of folded wire 2 is not particularly raised from the hub 3 but sufficiently adhered to the outer surface of the hub 3 in such a way as to avoid any projecting step, with respect to the diameter "D" of the central flange, adapted to bring the subsequent spirals of wire in the correct winding chamber.

The present invention has achieved the pre-set objects.

Advantageously, the present invention provides a spool with facilitated wire loading.

Advantageously, the present invention provides a spool capable of making the loading procedure of the wire on the hub 3 more efficient.

In particular the terminal portion 9 of the hole 51, recessed inside the hub 3, keeps the wound wire 2 adherent to the hub without generating peaks that can, during the formation of successive spirals of wire wound about the hub, generate bumps of winding wire of the central flange 6 to reach the winding chamber about which the wire should not be wound.

In addition the guide recess 11 allows the wire 2 to rest on the hub 3 when approaching the upper flange or lower flange so that it does not form (raised) sections of wire that can generate bumps on the central flange.

The invention claimed is:

1. A winding spool (1) for a wire (2) of a type comprising:
   a hub (3) shaped as a hollow cylindrical body defining a cylindrical external surface (4) extending about a main axis (X-X);
   a channel (5) for guiding the wire (2) through the hub (3) and facilitating operations of winding the wire (2) about the hub, having an extension that is transversal to the main axis (X-X) terminating with a first hole (51) and a second hole (52), arranged at two opposite ends of the hub (3), afforded on the cylindrical surface (4);
   a central flange (6), having a disc-like ring shape, extending away from the cylindrical external surface (4) of the hub (3);
   an upper flange (7), having a disc-like ring shape, extending from the cylindrical external surface (4) lying substantially parallel to the preceding central flange (6); said central flange (6) and said upper flange (7) defining, together with the cylindrical external surface (4), a first winding chamber (13) of the wire (2) about the hub (3);
   a lower flange (8), having a disc-like ring shape, extending from the cylindrical external surface (4) lying substantially parallel to the central flange (6); said central flange (6) and said lower flange (8) defining, together with the cylindrical external surface (4), a second winding chamber (14) of the wire (2) about the hub (3);
   wherein said at least a hole (51,52) terminates with a respective terminal portion (9,10) made inside the cylindrical external surface (4);
   characterized in that said terminal portion (9, 10) proceeds, on the cylindrical external surface (4), with a guide recess (11, 12) able to channel the wire (2) from the hole (51, 52) to the flange (7, 8) contiguous to the central flange (6).

2. The spool according to claim 1, characterized in that said cylindrical external surface (4) has an external diameter (d); said terminal portion (9,10) of the hole (51,52) being afforded below the external diameter (d) of the cylindrical external surface (4).

3. The spool according to claim 2 characterized in that said terminal portion (9,10) being made by removal of material from the normal surface extension of the cylindrical external surface (4) having the diameter (d).

4. The spool according to claim 1, characterized in that said first hole (51) has a first terminal portion (9) and said second hole (52) has a second terminal portion (10).

5. The spool according to claim 4, characterized in that said terminal portion (9,10) proceeds, on the cylindrical external surface (4), with a guide recess (11,12) able to channel the wire (2) from the hole (51,52) to the flange (7,8) contiguous to the central flange (6), and further characterized in that said first terminal portion (9) continues, on the cylindrical external surface (4), with a guide recess (11), extending from the hole (51), in order to obliquely channel the wire (2) towards the upper flange and said second terminal portion (10) continues, on the cylindrical external surface (4), with a guide recess (12), extending from the hole (5), in order to obliquely channel the wire (2) towards the lower flange.

6. The spool according to claim 1, characterized in that said terminal portion (9,10) reduces a volume occupied by the portion of wire (2) folded on itself and exiting from the hole (51,52).

7. The spool according to claim 1, characterized in that said guide recess (11,12) has an extension along a direction (K-K) having an oblique orientation and extending, starting from the central flange (6), towards the upper flange or lower flange.

8. The spool according to claim 1, characterized in that said guide recess (11,12) facilitates, at the portion of the wire folded on itself and exiting from the hole, an adhesion of the wire to the hub (3) without projecting from the plan extension subtended by the flanges.

* * * * *